C. DUHEM.
GALVANIC-BATTERY.
No. 169,529. Patented Nov. 2. 1875.
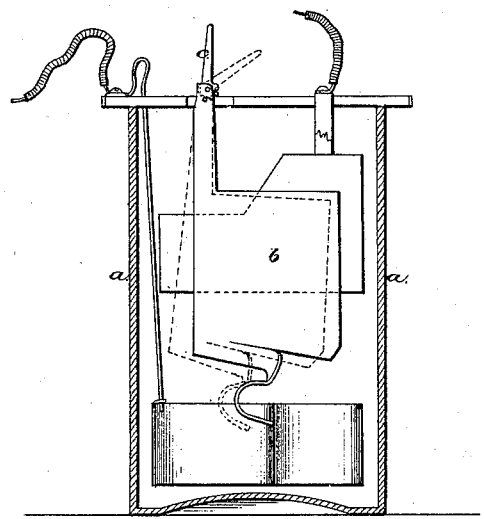

UNITED STATES PATENT OFFICE.

CONSTANT DUHEM, OF DENVER, COLORADO TERRITORY.

IMPROVEMENT IN GALVANIC BATTERIES.

Specification forming part of Letters Patent No. 169,529, dated November 2, 1875; application filed July 9, 1875.

*To all whom it may concern:*

Be it known that I, CONSTANT DUHEM, of Denver, in the county of Arapahoe and Territory of Colorado, have invented a new and improved mode of increasing the electrical force of galvanic batteries by a simple mechanical attachment, which I will call "Duhem's Positive Supplementary Electrode," which I will now proceed to describe, reference being had to the accompanying drawing forming part of this specification, in which—

Figure 1 is a perspective view of a galvanic battery or cup with my invention attached, showing the device connected; also a lever arrangement, by which it is held in or out of connection.

Similar letters of reference in the accompanying drawings denote the same parts.

This invention relates to galvanic batteries for telegraph or other purposes, in which, by the use of my invention, the current can be doubled in quantity instantly by moving the lever $c$ to nearly a perpendicular position, as shown, and has for its object to provide for the public a means for a more economical use of electricity, which shall be simple in its construction, sure and efficient in its operation, and by its use the same amount of work can be done with at least one-half of the ordinary number of cups and one-third the expense.

To these ends the invention consists in providing any cup or battery for telegraph or other purposes with a plate or piece of any of the different positive metals, suspended by any proper means in the exciting liquid between the positive and negative elements, the size and shape of the plate or piece of metal varying according to the cup or battery in which it is to be used.

In the drawings, $a\ a$ represent a galvanic battery or cup, and $b$ the plate or piece of metal called "Duhem's positive supplementary electrode." $c$ is the lever by which Duhem's positive supplementary electrode is connected or disconnected with the positive electro-pole of a battery without perceptibly disturbing the liquid. When in connection with the positive electro-pole the current is double in quantity, and remains so as long as desired, and falls to its original strength by being disconnected, as shown by dotted lines, thereby causing no unnecessary waste or use of material when not in use.

Having thus fully described my invention, what I claim as new, and desire to secure by Letters Patent, is—

The application to any galvanic battery of a positive supplementary electrode, capable of being easily and quickly connected or disconnected with the positive plate of a battery within the liquid, as described.

CONSTANT DUHEM.

Witnesses:
JAY A. MERRILL,
BART C. HEFLEY.